US008615656B2

(12) United States Patent
Weinstein et al.

(10) Patent No.: US 8,615,656 B2
(45) Date of Patent: Dec. 24, 2013

(54) SECURE REMOTE PERIPHERAL ENCRYPTION TUNNEL

(75) Inventors: David Weinstein, Laurel, MD (US); Scott Lewis Dyer, Bedford, MA (US)

(73) Assignee: The MITRE Corporation, McLean, VA (US)

( * ) Notice: Subject to any disclaimer, the term of this patent is extended or adjusted under 35 U.S.C. 154(b) by 5 days.

(21) Appl. No.: 13/346,291

(22) Filed: Jan. 9, 2012

(65) Prior Publication Data

US 2013/0179685 A1 Jul. 11, 2013

(51) Int. Cl.
*H04L 9/32* (2006.01)
*G06F 3/00* (2006.01)

(52) U.S. Cl.
USPC ........................................................ 713/168

(58) Field of Classification Search
USPC ........................................................ 713/168
See application file for complete search history.

(56) References Cited

U.S. PATENT DOCUMENTS

| | | | | |
|---|---|---|---|---|
| 5,596,718 A | * | 1/1997 | Boebert et al. | 726/16 |
| 5,822,435 A | | 10/1998 | Boebert et al. | |
| 8,316,228 B2 | * | 11/2012 | Winslow | 713/153 |
| 2010/0153704 A1 | * | 6/2010 | Winslow | 713/153 |
| 2012/0331304 A1 | * | 12/2012 | She et al. | 713/189 |

FOREIGN PATENT DOCUMENTS

| | | |
|---|---|---|
| GB | 2 267 986 | 12/1993 |
| WO | WO-2010/071947 | 7/2010 |

OTHER PUBLICATIONS

Aaron, G. (2010). "The State of Phishing," *Computer Fraud & Security:* 5-8.

Baratto, R. et al. (2005) "THINC: A Virtual Display Architecture for Thin-Client Computing" In Proceedings of the twentieth ACM symposium on Operating Systems Principles, New York, NY, USA, pp. 277-290.

Beagleboard homepage located at http://beagleboard.org visited on Jan. 23, 2012; 6 pages.

Cook, D. et al. (2004). "CryptoGraphics: Secret Key Cryptography Using Graphics Cards" 18 pages.

Department of Defense Trusted Computer System Evaluation Criteria. (Dec. 1985), 116 pages.

Finisterre, K. (2009) "Wyse Rapport Hagent Fake Hserver Command Execution." located at http://www.metasploit.com/modules/exploit/multi/wyse/hagent_untrusted_hsdata visited on Jan. 20, 2012; 5 pages.

Harrison, O. et al. (2008) "Practical Symmetric Key Cryptography on Modern Graphics Hardware" In Proceedings of the 17$^{th}$ Conference on Security Symposium, Berkeley, CA, USA, USENIX Association, pp. 195-209.

(Continued)

*Primary Examiner* — Kambiz Zand
*Assistant Examiner* — Aubrey Wyszynski
(74) *Attorney, Agent, or Firm* — Morrison & Foerster LLP

(57) ABSTRACT

A Secure Remote Peripheral Encryption Tunnel (SeRPEnT) can be implemented in a portable embedded device for the Universal Serial Bus (USB) with a much more restricted attack surface than a general purpose client computer. The SeRPEnT device can comprise a small, low-power "cryptographic switchboard" that can operate in a trusted path mode and a pass-through mode. In the trusted path mode, the SeRPEnT device can tunnel connected peripherals through the client to a server with Virtual Machine (VM)-hosted applications. In the pass-through mode, the SeRPEnT device can pass-through the connected peripherals to the client system, allowing normal use of the local system by the user. SeRPEnT can also enable secure transactions between the user and server applications by only allowing input to the VMs to originate from the SeRPEnT device.

25 Claims, 12 Drawing Sheets

(56) References Cited

OTHER PUBLICATIONS

Hirofuchi, T. et al., (2005) "USB/IP—A Peripheral Bus Extension for Device Sharing over IP Network" In Proceedings of the annual conference on USENIX Annual Technical Conference, Berkeley, CA., USA, USENIX Association, pp. 47-60.

Laurie, B., et al. "Choose the Red Pill and the Blue Pill: A Position Paper." NSPW '08. Sep. 22-25, 2008. Lake Tahoe, CA, USA, 7 pages.

"Linux-USB Gadget API Framework" (Jun. 8, 2005) located at http://www.linux-usb.org/gadget/ visited on Jan. 23, 2012; 6 pages.

Loscocco, P. et al. (1998) "The Inevitability of Failure: The Flawed Assumption of Security in Modern Computing Environments" In Proceedings of the $21^{st}$ National Information Systems Security Conference, pp. 303-314.

McCune, J. et al. (2006). "Bump in the Ether: A Framework for Securing Sensitive User Input" In Proceedings of the annual conference on USENIX Annual Technical Conference, Berkeley, CA., USA, USENIX Association, 14 pages.

Reed, B. "New Trojan Intercepts Online Banking Information: Can record keystrokes, capture screen images and steal confidential financial information, says Symantec." (Jan. 14, 2008) Located at http://www.networkworld.com/news/2008/011408-silentbanker-trojan.html visited on Jan. 23, 2012; 2 pages.

Schneier, B. (Apr. 2005). "Two-Factor Authentication: Too Little, Too Late," *Communications of the ACM* 48(4):136.

Weigold, T. et al. (2008) "The Zurich Trusted Information Channel—An Efficient Defence Against Man-in-the-Middle and Malicious Software Attacks" In Proceedings of the $1^{st}$ International Conference on Trusted Computing and Trust in Information Technologies: Trusted Computing—Challenges and Applications, Berlin, Heidelberg, Springer-Verlag, pp. 75-91.

Yang, J. et al. (2007) "Symmetric Key Cryptography on Modern Graphics Hardware" ASIACRYPT, 17 pages.

Wyse Security Bulletin WSB09-01-Important: Security Update available for Wyse Device Manager released Jul. 10, 2009. 1 page.

Wyse Technology homepage located at http://www.wyse.com visited on Jan. 24, 2012; 1 page.

Wyse Technology, Products and Services located at http://wyse.com/products/hardware/index.asp visited on Jan. 23, 2012; 4 pages.

International Search Report and Written Opinion mailed Apr. 26, 2013, directed to International Application No. PCT/US2013/020564; 10 pages.

\* cited by examiner

SECURE REMOTE PERIPHERAL ENCRYPTION TUNNEL

FIELD OF THE DISCLOSURE

This relates to providing secure communications, and more particularly, to providing a trusted path that connects a remote server directly to a client endpoint system's hardware peripherals.

BACKGROUND

Client endpoint systems are a prime target for attackers of every sophistication level. These systems take part in many transactions demanding a degree of trust that can no longer be placed on a general-purpose, commodity, computer system.

In 1985, the Department of Defense Trusted Computer System Evaluation Criteria defined a "trusted path" as "[a] mechanism by which a person at a terminal can communicate directly with the Trusted Computing Base. This mechanism can only be activated by the person or the Trusted Computing Base and cannot be imitated by untrusted software."

In 1998, Loscocco et al., recognized the abandonment of the ability to support a trusted path and Mandatory Access Control (MAC) in prevailing commercial operating systems, but reiterated the importance of these mechanisms, warning of "the inevitability of failure" in their absence. [Loscocco, P. A., Smalley, S. D., Muckelbauer, P. A., Taylor, R. C., Turner, S. J., and Farrell, J. F. The inevitability of failure: The flawed assumption of security in modern computing environments. In Proceedings of the 21st National Information Systems Security Conference (1998), pp. 303-314.]

By 2008, commercial operating systems had much better capabilities to support MAC, but still no reliable mechanism to support a trusted path for use in authenticating users. In a 2008 position paper, Laurie and Singer suggested that it was no longer realistic to expect an operating system ("OS") to maintain its full functionality and flexibility while also being able to provide a trusted path. [Laurie, B., and Singer, A. Choose the red pill and the blue pill. In NSPW '08 (Lake Tahoe, Calif., September 2008).]

Further exacerbating the issue is today's explosive growth of the Internet and networked computing. There are many remote services that depend on an ability to securely authenticate a transaction on behalf of a user. Online banking requires the guarantee that transfer of funds be initiated by the legitimate owner of the account. In system administration there is a need to securely manage the configuration of devices such as routers or virtualization servers, which can affect thousands of users. In classified networks there is the need to initiate file transfers between classification domains. But in all of these cases, without a trusted path the server cannot know the client is not compromised and controlled by a malicious agent. Without a trusted path, compromised endpoint systems have facilitated identity theft, bank fraud, and the theft of user credentials. [Aaron, G. The state of phishing. Computer Fraud & Security 2010, 6 (2010), 5-8.]

Despite these vulnerabilities, servers continue to trust the client's operating environment and assume that all requests are initiated by the user, rather than assume that the client system is compromised.

SUMMARY

To make sensitive transactions more secure, a new kind of trusted path—a Secure Remote Peripheral Encryption Tunnel (SeRPEnT)—is provided that can connect a server directly to a client's hardware peripherals. By facilitating a bidirectional cryptographic tunnel from the server—through the compromised host—directly to the user's peripherals, the way remote services perform input and output to and from users can be re-architected such that guarantees on the authenticity of the actions performed by the user are now possible. This capability can isolate a compromised endpoint from its peripherals during security sensitive applications, and such connectivity can be made unforgeable, strong against eavesdropping and tied to a user's credentials using cryptography.

SeRPEnT can be implemented in a portable embedded device for the Universal Serial Bus (USB) with a substantially more restricted attack surface than a general purpose client computer. The SeRPEnT device can comprise a small, low-power "cryptographic switchboard" that can operate in a trusted path mode and a pass-through mode. In the trusted path mode, the SeRPEnT device can tunnel connected peripherals through the client to a server with Virtual Machine (VM)-hosted applications. In the pass-through mode, the SeRPEnT device can pass-through the connected peripherals to the client system, allowing normal use of the local system by the user. SeRPEnT can also enable secure transactions between the user and server applications by only allowing input to the VMs to originate from the SeRPEnT device. SeRPEnT thus drastically reduces the attack surface currently exposed to an adversary.

DETAILED DESCRIPTION

Decoupling key subsystems of a commodity computer and creating cryptographic compartments in a small, portable hardware device external to the untrusted system can be used to create trusted paths for critical transactions. Given a limited budget that can be spent by an organization on security, this approach can lead to savings on managing intrusions introduced by poorly configured or unpatched client systems. Rather than hardening the vast number of disparate client systems each individually, the focus can instead be on hardening the purpose-built subsystems and servers. By maintaining a high degree of usability for the user and not by depending on thick-client capabilities, a user can be simply allowed a decision of being in one of two domains—untrusted local or trusted remote.

A Secure Remote Peripheral Encryption Tunnel (SeRPEnT) is provided that can connect a server directly to a client's hardware peripherals. In some embodiments, SeRPEnT can be implemented in a "thinner-than-thin" portable embedded device that couples with a "thick" client computer. While embodiments described herein describe a SeRPEnT device that can be implemented pursuant to a "thinner-than-thin" architecture, it should be understood that a SeRPEnT device can be implemented with varying degrees of thinness or thickness, such as incorporating a display, incorporating an operating system to interact with a user, etc.

"Thick" client systems such as general purpose computers are a prime target for attack because of the general purpose and feature-rich environment they expose to an attacker. A thick client system is constantly evolving, adding new features, capabilities and interacting with a vast number of disparate systems. In the case of enterprise environments, these systems can become a parasite by which an attacker can exfiltrate data or act as a remote viewer into a protected network. These systems can be decomposed into smaller subsystems, i.e., peripherals, that play important roles in network computing.

Peripherals can be viewed as collections of microelectronics abstracted from the user by the operating system and device drivers. Applications interface with the operating system kernel to utilize hardware resources and to perform specific tasks such as keyboard/mouse input or displaying images to a user on a monitor. Some tasks are nearly invisible to the user (e.g., networking), comprising multiple layers of abstraction such as those shown in FIG. 1.

Figure 1:
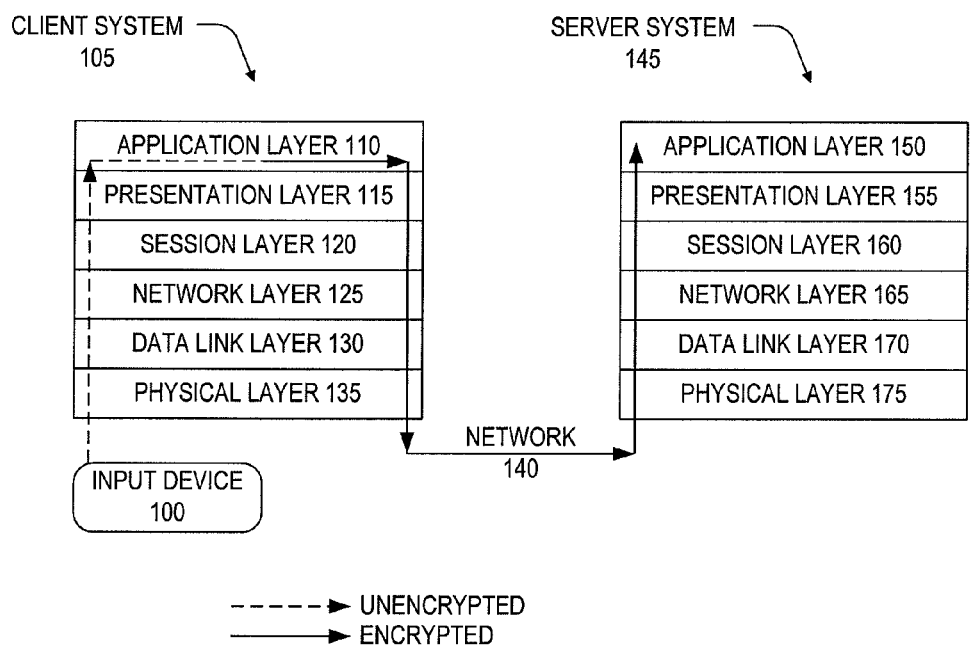
FIG. 1 illustrates an example of inter-application encryption between a server and client system.

FIG. 1 illustrates an example of inter-application encryption between a server and a thick client system through an Open Systems Interconnection ("OSI") model. Client system 105 comprises application layer 110, presentation layer 115, session layer 120, network layer 125, data link layer 130 and physical layer 135, and server system 145 comprises application layer 150, presentation layer 155, session layer 160, network layer 165, data link layer 170 and physical layer 175. As noted by the key, the dotted arrows, which flow from input device 100 to application layer 110, represent unencrypted data flow, and the solid arrows, which flow from application layer 110 to application layer 150 via network 140, represent encrypted data flow.

Application layers 110 and 150 are the highest abstraction layers and where the user's interactions are imparted, so it is natural to think of the user as logically at the top of the stack. However, as shown in FIG. 1 a user of an endpoint is physically interacting with input device 100, and is therefore actually at the bottom of the stack. Many of the use cases in need of secure computing capabilities involve two systems, each with underlying hardware, operating systems and applications. Therefore a client's interaction logically traverses multiple stacks, both inbound and outbound on multiple hosts.

Figure 2:
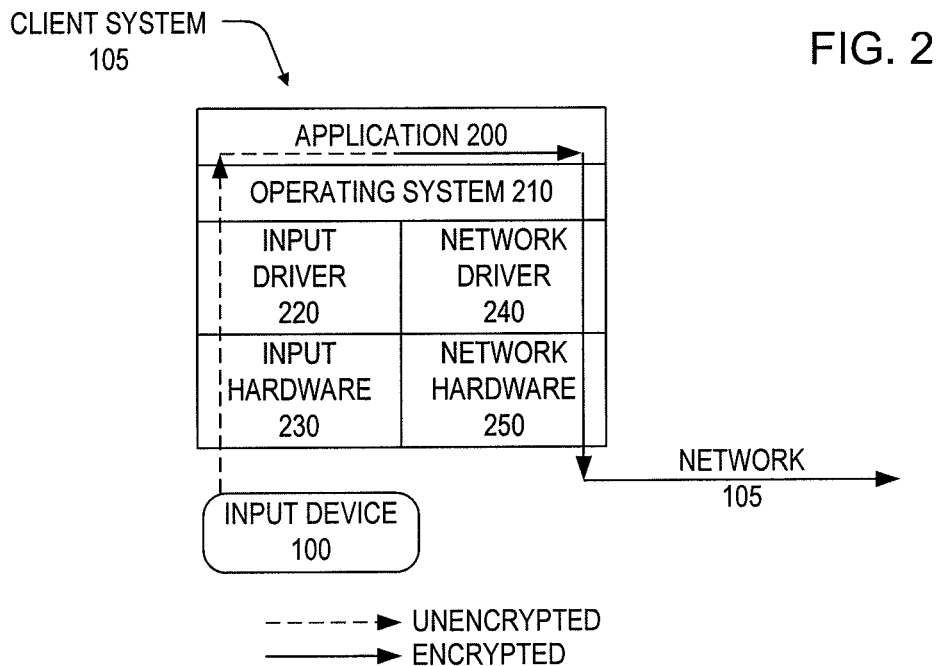
FIG. 2 illustrates an example of a trusted path for peripheral input that is vulnerable to malware on a compromised endpoint.
Figure 3:
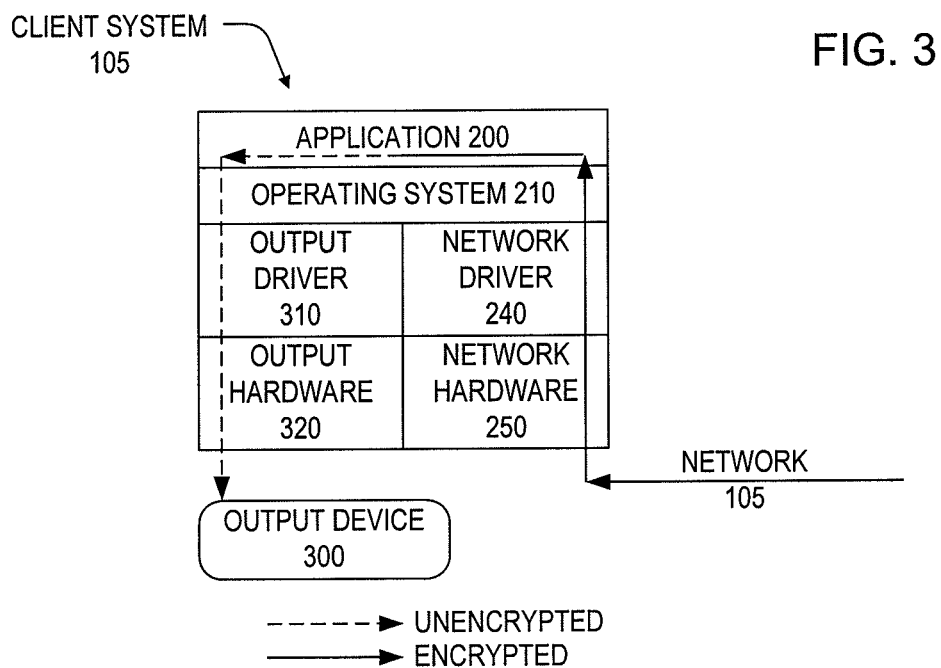
FIG. 3 illustrates an example of a trusted path for peripheral output that is vulnerable to malware on a compromised endpoint.

For example, FIG. 2 illustrates an example of a trusted path for peripheral input that is vulnerable to malware on a compromised endpoint, and FIG. 3 illustrates an example of a trusted path for peripheral output that is vulnerable to malware on a compromised endpoint. Client system 105 comprises application 200, operating system 210, input driver 220, input hardware 230, output driver 310, output hardware 320, network driver 240 and network hardware 250, all of which can comprise commodity systems/components.

As shown in FIG. 2, when a user provides input at input device 100, such as typing at a keyboard, she is manipulating input hardware 230 that performs signaling to input driver 220 (e.g., the device driver(s) associated with input device 100) by which the input is delivered to application 200 by operating system 210. Any malicious hook of this path along the way compromises the input. Similarly, as shown in FIG. 3, any visual data that is displayed to the user passes through operating system 210, down to output driver 310 (e.g., the device driver(s) associated with output device 300) into output hardware 310. It is the lack of a trusted path to/from the peripheral hardware (and user) that remains a common vulnerability.

It is common for thick clients to be used as remote access nodes to server administration interfaces. For example, an IP-enabled keyboard, video, and mouse (IP-KVM) appliance is commonly used to simplify remote access to these interfaces. However, using a thick client in conjunction with an IP-KVM to access these resources can place the integrity of remote services at great risk. Software on the thick client system could be used to harvest credentials, or if a two-factor authentication system is being used, the browser session could be hijacked and injected with commands used to open nefarious entry points to the server.

There are many potential benefits to "thin" client-based architectures, among them reduced total cost of ownership, simpler provisioning, and faster centralized patching of the backend. One of the main security benefits for moving to a thin client architecture is the reduced attack surface on the endpoint. The thin client system ideally runs a stripped down OS with only enough complexity to send user input to the backend and return video from the backend to the display. However, in practice, commercial thin client providers have found that very few customers are willing to accept a true thin client environment.

For instance, Wyse supports a range of products of varying thinness. They start with 5 models of devices which run their proprietary ThinOS, for which security is highlighted through obscurity of their "unpublished API." This proprietary system would likely enjoy some trustworthiness advantages over their other product offerings in the thin client category, which include 6 variants on Linux-based thin client OSes, and 21 variants of Windows-based systems. However, particularly worrisome is that the 27 of 32 non-ThinOS models support mechanisms to offload "rich media" processing such as flash videos to the thin client, making it that much less thin, and having that much more attack surface. Although no exploits have been found for this capability yet, given that other exploits have been found in the past on the not-so-thin clients from Wyse, it raises the question of the security implications of organizations thinking they're getting zero-vulnerability endpoints.

That commercial vendors have been pushed to include this type of feature in their devices is in large part a consequence of end-user expectations. They expect to be able to watch YouTube videos on their systems. This expectation gets conveyed to IT organizations, who must therefore compromise the "purity" of the thin client implementation, to be responsive to user demands. Given this, a third path can be provided that allows users to still have fully functional standalone computing resources, while pulling the resources for trusted path computation physically out of the likely-compromised endpoint.

Since the increasing complexity that leads to the inevitability of endpoint compromise can creep into commercial thin-client products as well, SeRPEnT can be implemented in a portable embedded device configured as a "thinner-than-thin" client that pulls the core trusted computing base out of the larger and more complicated thick general purpose system. The SeRPEnT device can be implemented as a purpose-built System on Chip (SoC) with the architectural goal of inducing increased cost for an adversary to compromise each individual subsystem of a computer. The SeRPEnT device can be configured to interface with such subsystems that are specialized on their kind of input or output for efficiency, severable from different untrusted components of the computer system, and each capable of public-key cryptography. Advantages of the present disclosure derive not only from the goal of compartmentalization itself, but from the additional constraint that these concepts can be implemented in the context of commodity hardware and software. Thus, a computer OS that is locally orchestrating these components can be fully isolated in use cases requiring the trusted path of the present disclosure, without the proper configuration or availability of a Trusted Platform Module (TPM).

Figure 4:
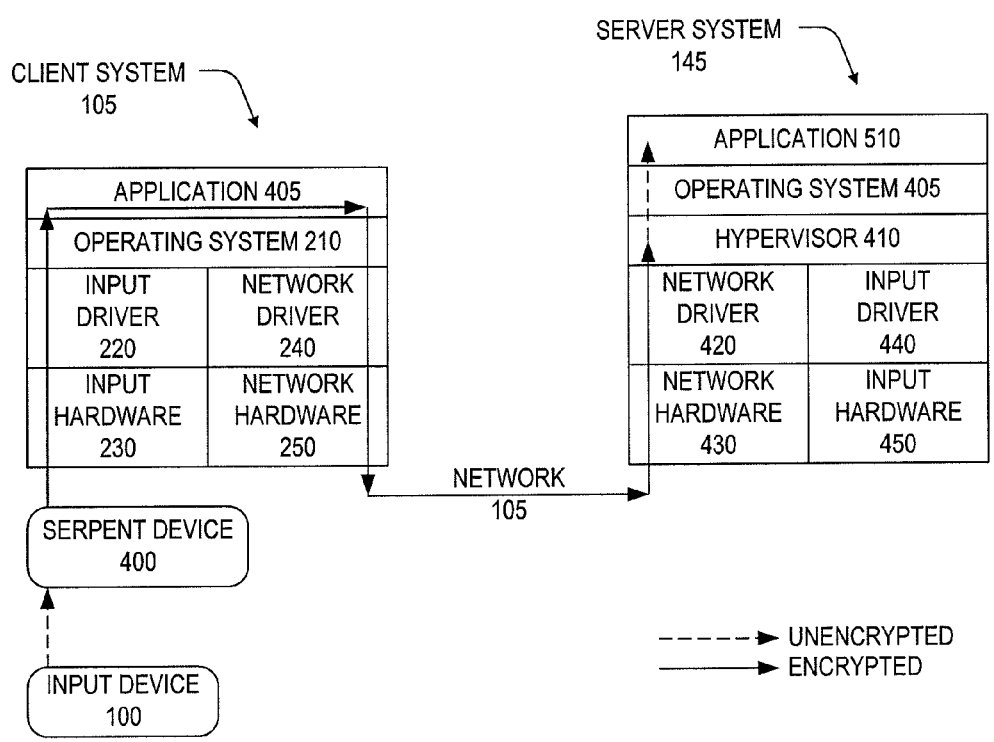
FIG. 4 illustrates an example of a trusted input path between a SeRPEnT device and SeRPEnT server in accordance with one embodiment.

An example of a SeRPEnT device is depicted in FIG. 4, which illustrates an example of a trusted input path between a SeRPEnT device and a SeRPEnT server (e.g., a server configured to communicate with a SeRPEnT device through a network) in accordance with one embodiment. Client system 105 can comprise a commodity OS with a stack that cannot guarantee trusted path to a user but can have encrypted data imparted from an application.

In this embodiment, SeRPEnT device 400 can be configured not to run an embedded OS meant to interact with users, but rather to only encrypt peripheral input from input device 100 and send it into the endpoint (i.e., client system 105). Client system 105 can host application 405, which can be configured to receive encrypted input from SeRPEnT device 400 and forward it on to server system 145.

Server system 145 comprises application 510, operating system 405, hypervisor 410, network driver 420, network hardware 430, input driver 440 and input hardware 450. Operating system 405, network driver 420, network hardware 430, input driver 440 and input hardware 450 can comprise commodity systems/components, while hypervisor 410 can be configured to receive and decrypt the encrypted input from SeRPEnT device 400 and inject it into operating system 405 to be provided to application 510 as though the input had been provided from client system 105 without any encryption or SeRPEnT device 400. Server system 145 (e.g., via hypervisor 410) can also be configured to not accept any input from the untrusted endpoint (i.e., client system 105) that isn't encrypted by SeRPEnT device 400.

The present disclosure is not limited to virtual machine server embodiments in which the operating system is run on top of a hypervisor (i.e., a virtual machine manager). Rather, in other embodiments a virtual machine need not be implemented by server system 145 and operating system 405 itself can be configured to receive and decrypt the encrypted input from SeRPEnT device 400 and provide the decrypted input to application 510.

Figure 5:
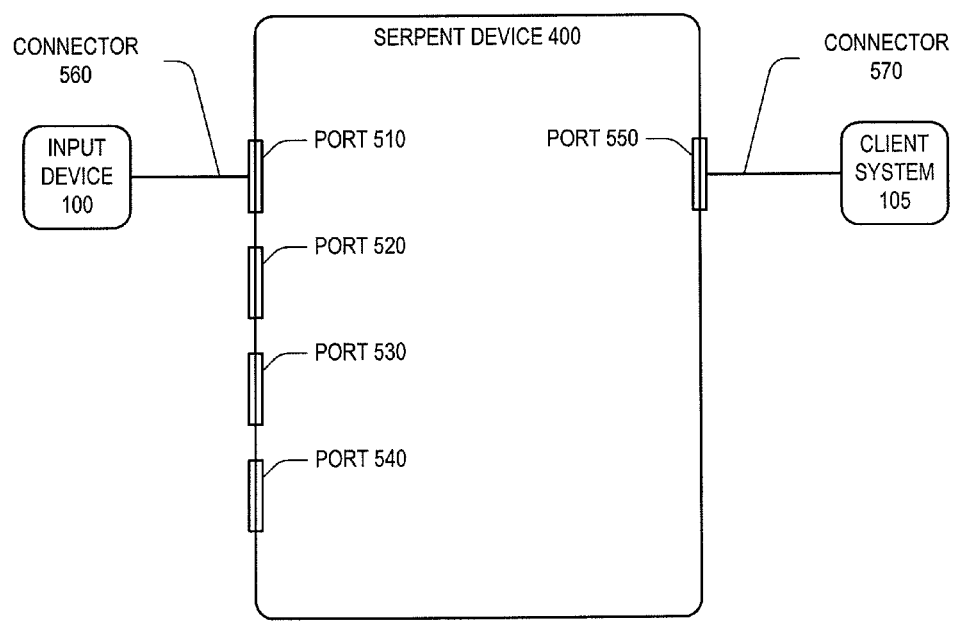
FIG. 5 illustrates an example of a SeRPEnT device in accordance with one embodiment.

FIG. 5 illustrates an example of a SeRPEnT device in accordance with one embodiment. SeRPEnT device 400 comprises one or more physical ports or connection points (e.g., ports 510, 520, 530 and 540) that are connectable to peripheral devices such as input or output devices, and comprises a physical port or connection point (e.g., port 550) that is connectable to a computer. As shown in FIG. 5, input device 100 is connected to SeRPEnT device 400 through port 510 via connector 560, and SeRPEnT device 400 is connected to client system 105 through port 550 via connector 570.

The one or more ports connectable to peripheral devices can comprise USB ports, such as upstream USB ports configured to provide downstream connections to connected peripheral devices. The port connectable to a computer can comprise a USB port, such as a downstream USB port configured to provide an upstream connection to the computer. Connectors 560 and 570 can comprise any suitable USB connector, including physical USB cable connectors or wireless USB connectors comprising wireless USB adaptors configured to connect to associated ports on each device and provide a connection therethrough. In some embodiments, from the outside SeRPEnT device 400 can exhibit the appearance of a commodity USB hub. SeRPEnT device 400 can comprise circuitry configured to make SeRPEnT device 400 appear to a connected computer as a single Universal Serial Bus (USB) composite device with an interface for each connected peripheral device.

The connectors can be attachable or integrated with SeRPEnT device 400. For example, connector 560 can be attachable with SeRPEnT device 400 such that connector 560 can be plugged in to and removed from SeRPEnT device 400 by a user, while connector 570 can be integrated with SeRPEnT device 400 such that connector 570 is not removable from SeRPEnT device 400 by a user.

SeRPEnT device 400 can also provide other physical ports or connection points (not shown), such as a power port and a network port. The power port can be connectable to a power source that can supply power for peripheral devices connected to SeRPEnT device 400. The network port can be connectable to network 105 (e.g., an Ethernet port) to allow for device upgrades.

The present disclosure is also not limited to embodiments in which the ports of SeRPEnT device 400 comprise USB ports. Rather, in other embodiments the ports can be configured to interface with peripheral devices and a computer using any suitable standard in accordance with the teachings of the present disclosure.

SeRPEnT device 400 can comprise circuitry configured to operate in a pass-through (unencrypted/local) mode and a trusted path (encrypted/remote) mode. For example, in the pass-through mode, the circuitry can pass input received from input device 100 via port 510 through to the client system 105 via port 550. In the trusted path mode, the circuitry can encrypt input received from input device 100 via port 510 and send the encrypted input to client system 105 via the port 550. SeRPEnT device 400 can provide a switch such as a button that a user can actuate to switch the circuitry between operating in the pass-through mode and the trusted path mode.

For purposes of the present disclosure, the expression "pass through" is intended to convey forwarding without alteration, addition or subtraction. Thus, when SeRPEnT device 400 passes data through in the pass-through mode, SeRPEnT device 400 does not alter, add to or take anything away from the data in any way. Additionally, the expression "circuitry" is not limited to any particular type of hardware, but rather applies to any suitable processor or logic that can implement the indicated function.

Figure 6:
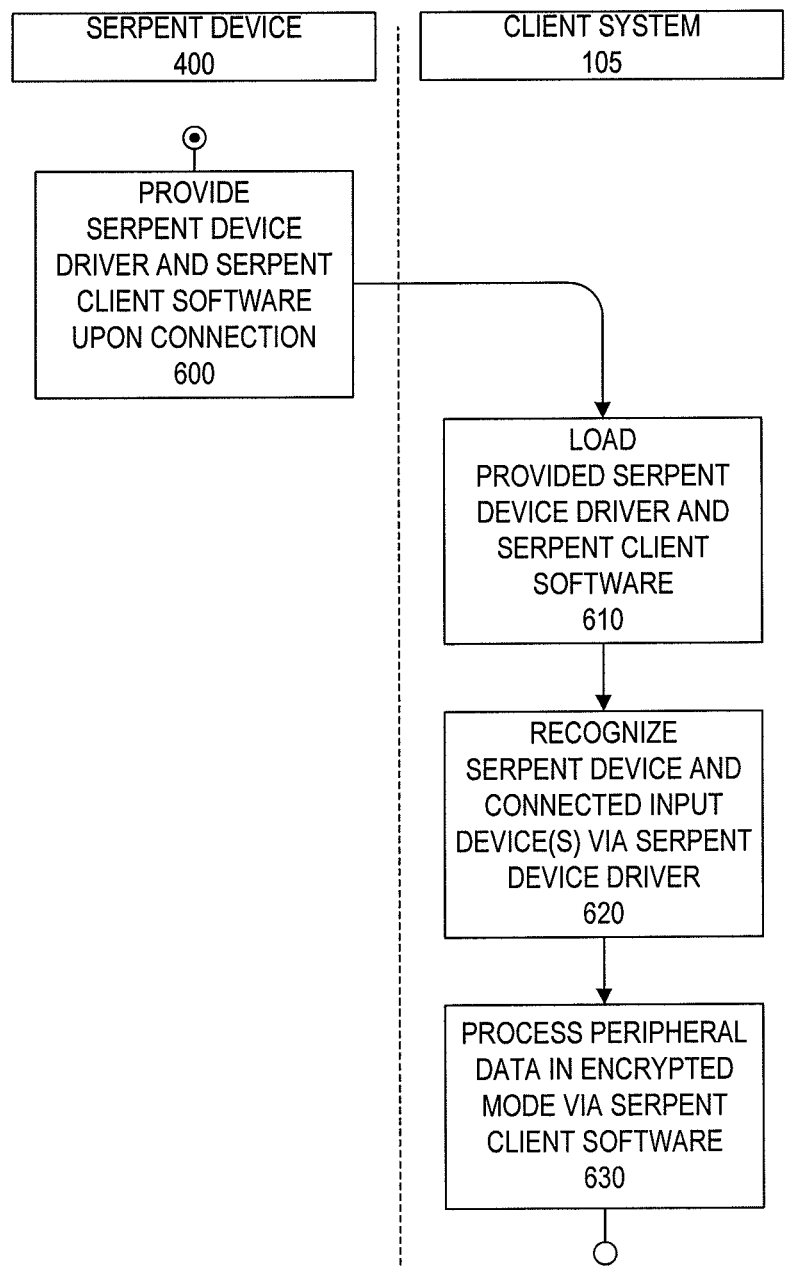
FIG. 6 illustrates an example of a SeRPEnT device connection process in accordance with one embodiment.

As shown in FIG. 6, SeRPEnT device 400 can also store and provide to client system 105 the software to enable client system 105 to recognize the SeRPEnT device and provide the trusted path. For example, upon connecting SeRPEnT device 400 to client system 105 via connector 5170, SeRPEnT device 400 can provide a SeRPEnT device driver and SeRPEnT client software to client system 105 (block 600). The device driver can enable client system 105 to recognize SeRPEnT device 400 and any connected peripheral device connected thereto (e.g., as a USB composite device with interfaces for the connected peripheral devices as described above). The SeRPEnT client software can enable client system 105 to implement the trusted path for data traveling between any peripheral device connected to SeRPEnT device 400 and server system 145. Thus, once client system 105 loads the provided SeRPEnT device driver and SeRPEnT client software (block 610), it can recognize SeRPEnT device 400 and any connected peripheral device using the SeRPEnT device driver (block 620) and process peripheral data in trusted path mode via the SeRPEnT client software (block 630).

While the embodiment shown in FIG. 6 discloses the SeRPEnT device driver and SeRPEnT client software stored on and provided by SeRPEnT device 400, the SeRPEnT device driver and/or SeRPEnT client software can be provided remotely (e.g., across network 140) in other embodiments, such as by server system 145. In such embodiments, upon connection of SeRPEnT device 400 to client system 105, SeRPEnT device 400 can direct client system 105 to the remote location where the SeRPEnT device driver and/or SeRPEnT client software can be obtained.

Figure 7:
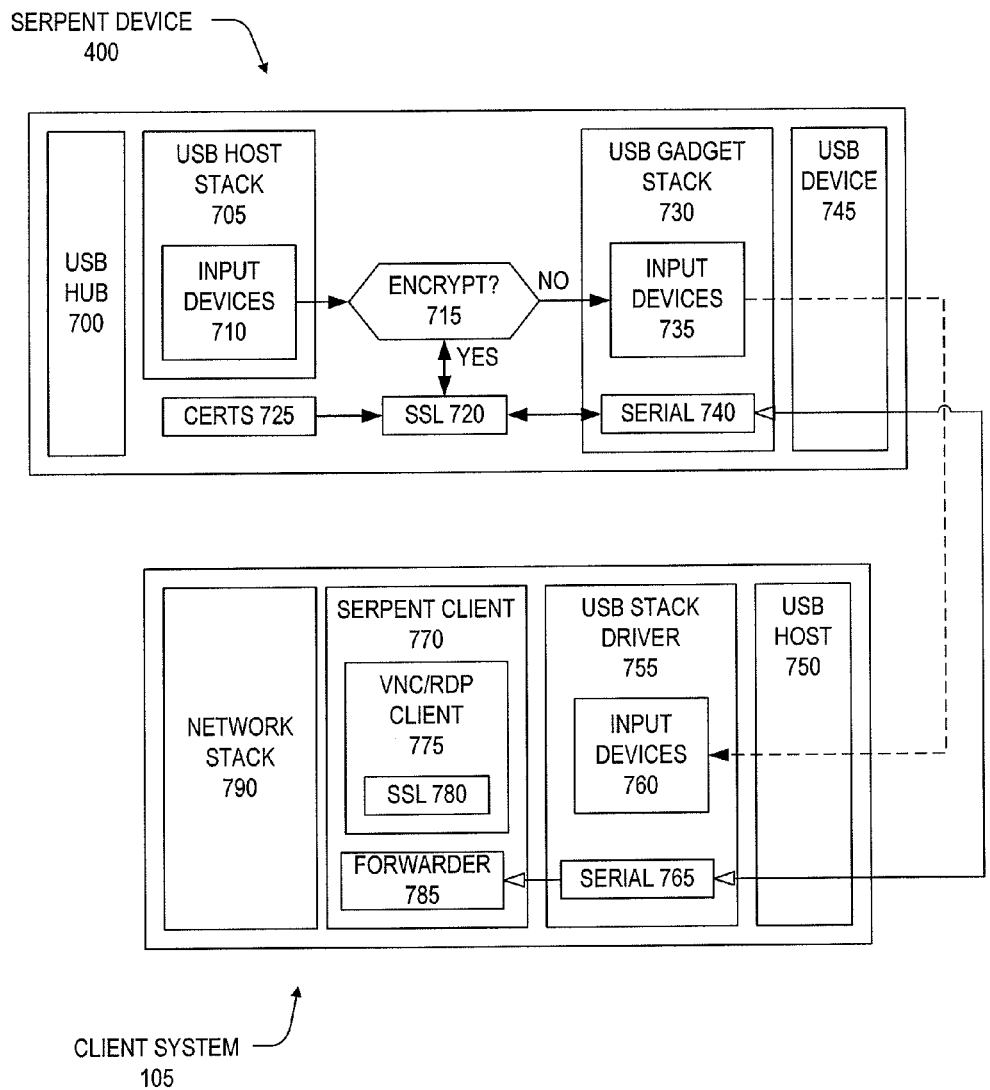
FIG. 7 illustrates an example of a trusted input path between a SeRPEnT device and a client system in accordance with one embodiment.

FIG. 7 illustrates an example of a trusted input path between a SeRPEnT device and client system in accordance with one embodiment. As shown in FIG. 7, SeRPEnT device 400 comprises USB hub 700, USB host stack 705, certificates 725, USB gadget stack 730, USB device 745 and circuitry configured to provide the encryption and pass-through modes described above (i.e., block 715) and to provide Secure Sockets Layer ("SSL") functionality (i.e.; block 720). Input devices 710 and 745 comprise interfaces, provided in USB host stack 705 and USB gadget stack 730 respectively, through which input from connected input devices can pass through SeRPEnT device 400 in pass-through mode. Serial 740 comprises an interface, provided in USB gadget stack 730, through which input from connected input devices that is encrypted by SeRPEnT device 400 is provided to a connected client system 105 in trusted path mode.

Figure 8:
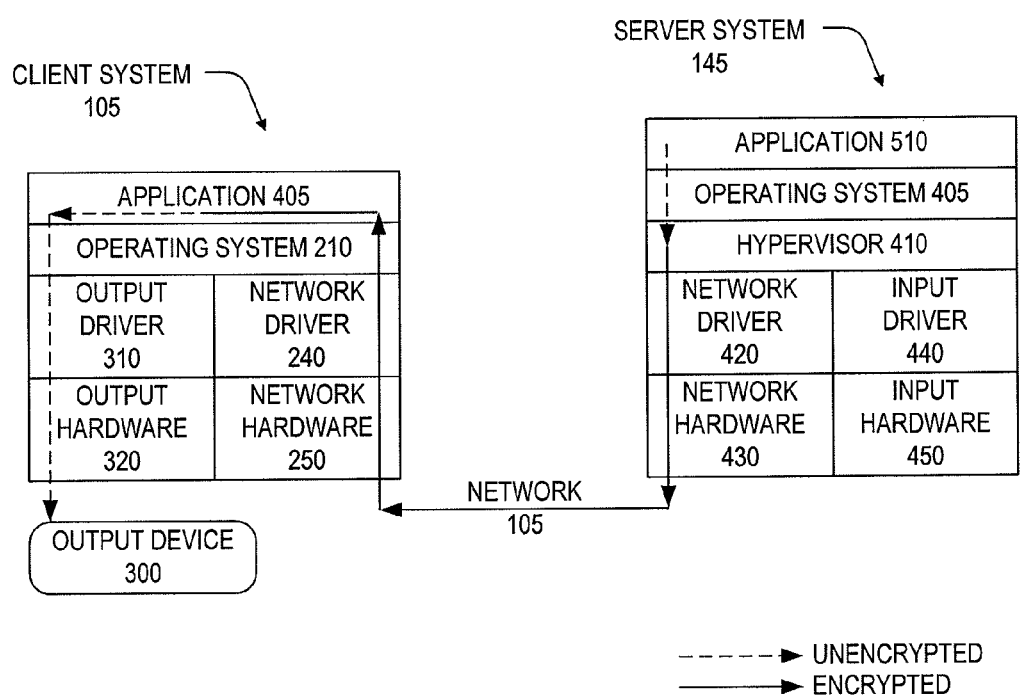
FIG. 8 illustrates an example of a trusted output path between a SeRPEnT server and client system in accordance with one embodiment.

Client system 105 comprises USB host 750, USB stack driver 755, SeRPEnT client 770 and network stack 790. Input devices 760 comprises an interface, provided in USB stack driver 755, through which input passed through by SeRPEnT device 400 in pass-through mode arrives at client system 105. Serial 765 comprises an interface, provided in USB stack driver 755, through which input encrypted by SeRPEnT device 400 in trusted path mode arrives at client system 105. SeRPEnT client 770 comprises SeRPEnT client software loaded pursuant to block 610, for example, and comprises VNC/RDP client 775 and forwarder 785. Forwarder 785 enables client system 105 to forward to server system 145 input encrypted by SeRPEnT device 400 in trusted path mode as shown in FIG. 4. VNC/RDP client 775 comprises remote desktop software that can receive encrypted output from server system 145 through a trusted output path from the SeRPEnT server to client system 105, decrypt the received output via SSL 780 and output it via an untrusted path through output driver 310 and output hardware 320 to output device 300 as shown in FIG. 8.

SeRPEnT device 400 can be made using BeagleBoard xM rev C hardware provided by BeagleBoard.org, the U-Boot universal bootloader, a custom Linux 2.6.39 Kernel and the software logic necessary to properly direct input data. Everything can be stored on a 2 GB μSD card as this model of the BeagleBoard has no NAND flash. The BeagleBoard can be ideal for rapid development because of its strong open-source community support and its ability to act as both a USB host and device. However, SeRPEnT device 400 can be implemented with a smaller subset of both hardware and software (e.g., no need for S-video or HDMI display) to reduce cost, size, and its attack surface, which further limits the potential for attacks on or misuse of SeRPEnT device 400.

A read-only filesystem can be used to prevent filesystem corruption due to power loss and help mitigate the persistence of a successful attack against SeRPEnT device 400. To allow for upgradability the board's Ethernet hardware can be used. This can allow a testing group to use the device while also allowing for modifications without needing to be physically present at each device. When being upgraded, the firmware can be remounted with read-write privileges and, after being rebooted, can be returned to being read-only. SeRPEnT device 400 can also utilize common access card ("CAC") technologies for user authentication of and for keying material.

SeRPEnT device 400 can use any suitable type of cryptography in trusted path mode, such as public-key cryptography. For example, standard OpenSSL libraries can be used with self-signed certificates (created at a central/trusted location) for two-way mutual authentication between SeRPEnT device 400 and a SeRPEnT server (e.g., server system 145). For reduced power and filesystem size, an SSL implementation designed for embedded systems can be used such as AES-256 in CBC mode.

The architecture of SeRPEnT device 400 shown in FIG. 7 can use two key pairs, one for input devices and the other for output (e.g., client 775 viewing framebuffers). Before SeRPEnT device 400 is distributed to uses, the input private/public key pair can be generated and stored to the μSD card of the device (or internal memory in embodiments of the device that provide internal memory) along with the public key of the server. Server system 145 can store the public key of each device. The second key pair labeled output can be generated later and used for viewing the virtual machine's framebuffer from client system 105 via client 775). As this key can be currently stored on client system 105's untrusted system, these key pairs can bear different levels of trust.

SeRPEnT device 400 can use the Linux-USB Gadget API Framework to create the appearance of USB devices. This enables the device to be used in pass-through and trusted path mode as described above. A loadable kernel module can be created that allows SeRPEnT device 400, once plugged into client system 105, to appear as a single USB device with Human Interface Devices (HIDs) (e.g., for a keyboard and mouse) and a virtual serial port. Below a C structure is provided that can be used in the gadget framework to create an HID keyboard interface.

```
#include <linux/platform_device.h>
#include <linux/usb/g_hid.h>
/* hid descriptor for a keyboard */
static struct hidg_func_descriptor my_hid_kbd = {
    .subclass            = 0, /* No subclass */
    .protocol            = 1, /* Keyboard */
    .report_length       = 8,
    .report_desc_length  = 63,
    .report_desc         = {
        0x05, 0x01,    /* USAGE_PAGE (Generic Desktop) */
        0x09, 0x06,    /* USAGE (Keyboard) */
        0xa1, 0x01,    /* COLLECTION (Application) */
        0x05, 0x07,    /*   USAGE_PAGE (Keyboard) */
        0x19, 0xe0,    /*   USAGE_MINIMUM (Keyboard
```

```
                    LeftControl) */
0x29, 0xe7,     /* USAGE_MAXIMUM (Keyboard Right
                   GUI) */
0x15, 0x00,     /* LOGICAL_MINIMUM (0) */
0x25, 0x01,     /* LOGICAL_MAXIMUM (1) */
0x75, 0x01,     /* REPORT_SIZE (1) */
0x95, 0x08,     /* REPORT_COUNT (8) */
0x81, 0x02,     /* INPUT (Data,Var,Abs) */
0x95, 0x01,     /* REPORT_COUNT (1) */
0x75, 0x08,     /* REPORT_SIZE (8) */
0x81, 0x03,     /* INPUT (Cnst,Var,Abs) */
0x95, 0x05,     /* REPORT_COUNT (5) */
0x75, 0x01,     /* REPORT_SIZE (1) */
0x05, 0x08,     /* USAGE_PAGE (LEDs) */
0x19, 0x01,     /* USAGE_MINIMUM (Num Lock) */
0x29, 0x05,     /* USAGE_MAXIMUM (Kana) */
0x91, 0x02,     /* OUTPUT (Data,Var,Abs) */
0x95, 0x01,     /* REPORT_COUNT (1) */
0x75, 0x03,     /* REPORT_SIZE (3) */
0x91, 0x03,     /* OUTPUT (Cnst,Var,Abs) */
0x95, 0x06,     /* REPORT_COUNT (6) */
0x75, 0x08,     /* REPORT_SIZE (8) */
0x15, 0x00,     /* LOGICAL_MINIMUM (0) */
0x25, 0x65,     /* LOGICAL_MAXIMUM (101) */
0x05, 0x07,     /* USAGE_PAGE (Keyboard) */
0x19, 0x00,     /* USAGE_MINIMUM (Reserved) */
0x29, 0x65,     /* USAGE_MAXIMUM (Keyboard
                   Application) */
0x81, 0x00,     /* INPUT (Data,Ary,Abs) */
0xc0            /* END_COLLECTION */
   }
};
```

As provided below, a similar construction can be used for a mouse, and once these data structures are created, the devices can be registered with the framework:

```
static struct usb_composite_driver multi_driver = {
        .name        = "g_serpent,
        .dev         = &device_desc,
        .strings     = dev_strings,
/*      .bind        = multi_bind, */
        .unbind      = ___exit_p(multi_unbind),
        .iProduct    = DRIVER_DESC,
        .needs_serial = 1,
};
static struct platform_driver hidg_plat_driver = {
        .remove      = ___devexit_p(hidg_plat_driver_remove),
        .driver      = {
             .owner  = THIS_MODULE,
             .name   = "hidg",
        },
};
static int ___ref multi_bind(struct usb_composite_dev *cdev)
{
        int status;
        struct list_head *tmp;
        int status, gcnum, funcs = 0;
        list_for_each(tmp, &hidg_func_list)
                funcs++;
        /* no error checking: */
        /* set up HID: */
        status = ghid_setup(cdev->gadget, funcs);
        /* set up serial link layer: */
        status = gserial_setup(cdev->gadget, 1);
        status = cdc_config_register(cdev);
        /* ... */
}
static int ___init g_serpent_init(void)
{
        int status;
        /*
        platform_device_register(&my_hid_kbd);
        platform_device_register(&my_hid_mouse);
        status = platform_driver_probe(&hidg_plat_driver,
                   hidg_plat_driver_probe);
        status = usb_composite_probe(&multi_driver, multi_bind);
        /* error checking... */
}
```

Once the kernel module is loaded, SeRPEnT device 400 can appear as a multi-function composite device (i.e., a multi-interface, single composite device using USB Interface Association Descriptors). This connectivity can be made to client system 105 via the USB On-The-Go (OTG) port on the BeagleBoard.

These gadgets mimic real or common USB devices and are thus generally well-supported by commodity operating systems allowing for mostly a "plug-and-play" experience. While the design decision to use the CDC-ACM (Serial) device is one of simplicity in the embodiment of FIG. 7, in other embodiments the client only needs a way of receiving opaque (encrypted) data from SeRPEnT device 400 and sending it to server system 145. This can be accomplished in any suitable manner, such as using a composite device with a mass storage device interface instead of the serial port which, on some operating systems, may be better supported than Serial ports.

The HID and serial gadgets described above act as sinks in that data will be routed to them depending on the mode SeRPEnT device 400 has been placed in by the user. These can be viewed as static sinks in that they exist while the gadget module is loaded until SeRPEnT device 400 reboots. The sources, on the other hand, can be considered dynamic.

Currently keyboards and mice can be supported as input devices or sources. When plugged into SeRPEnT device 400, the Linux kernel of SeRPEnT device 400 can load the appropriate driver for the peripheral devices, create corresponding files in the /dev tree and finally a udev (udev is the device manager for the Linux kernel and manages nodes in the /dev tree) event can be generated. A userspace process can listen for these while filtering on keyboard/mouse devices to trigger registration of a new sources. Once registered, the open file handles for input devices can be read on-demand using a standard select call. Since SeRPEnT device 400 can support two basic modes of operation, data can be sent either to the gadget HID descriptors (via pass-through mode) or the gadget serial port (via trusted path mode) as shown in FIG. 7.

In addition to the device drivers loaded for SeRPEnT device 400's HID and serial interfaces, client system 105 can run a serial-to-TCP forwarder agent written in any suitable programming language such as Python. The forwarder can be unsophisticated and merely read the encrypted data from the serial device (e.g., serial 765) and encapsulate the frames into a TCP stream and to server system 145. Client system 105 can also run a standard VNC client with SSL (e.g., client 775) to connect to the server and view the current state of the VM's framebuffer.

On the backend, server system 145 can comprise a modified virtual machine (e.g., hypervisor 410), such as a QEMU-KVM virtual machine, with changes mainly to the handling of input sources in the VNC server code. The effect is that any input source other than those originating from SeRPEnT device 400 can be dropped silently at server system 145.

The sole purpose of the VNC Server, in this case, can be to manage the efficient distribution of the VM's framebuffer to client system 105. Changes can be made to QEMU to create an alternative input-path fronted by an SSL decryption process, which can decrypt the data sent by SeRPEnT device 400. In particular, QEMU can be modified to open a new (local) UNIX socket, which can be opened by an SSL shim for writing and the QEMU instance for reading. If data successfully passes the decryption process, it can be re-injected in the virtual machine to generate input events to the hosted operating system (e.g., operating system 405), effectively completing the trusted path to the VM. This system of this embodiment is OS-agnostic requiring no modifications to the OS kernel or specialized drivers, but in order to support a greater number of USB peripherals this can change in that a virtual USB bus can be created.

For example, USB/IP makes possible the transformation of monolithic "thin client" systems into loosely coupled and distributed peripheral systems. This work has played an important role in the refinement of thin-clients and has shown that networks (LAN and WAN) can be capable of operating a Virtual USB Bus and thus share hardware devices efficiently. This disclosure shows that a remote system can be used to isolate device drivers for a variety of bulk transfer and isochronous USB devices through a clever grouping of USB Transfer Descriptor (TD) packets into ethernet frames for batch processing. However, using this technique SeRPEnT device 400 can also host more than just the current set of USB input devices but also other devices such as thumb drives, web cameras, joysticks, etc.

Figure 9:
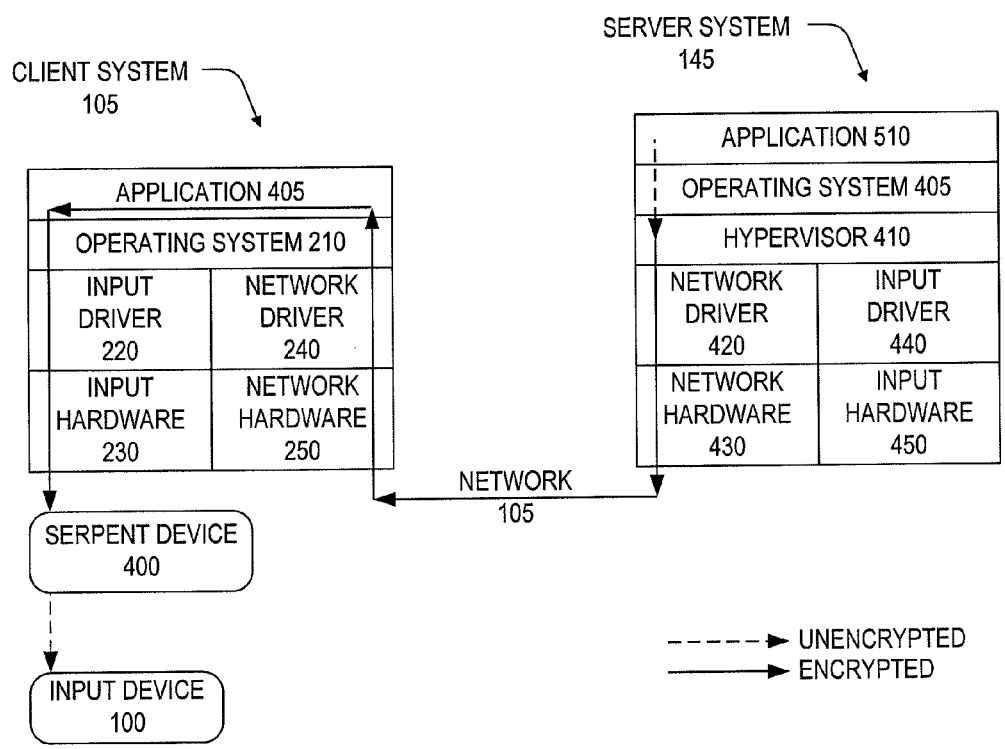
FIG. 9 illustrates an example of a trusted path from a SeRPEnT server to a SeRPEnT device for a peripheral input device in accordance with one embodiment.

The embodiment of FIGS. 4, 7 and 8 described above provides a trusted path for input provided by a peripheral input device that flows from a SeRPEnT device to a remote server system through a local client system. As shown in FIG. 9, this path can also be bidirectional in that output to the peripheral input device can be provided by the same trusted path which also flows from the remote server system to the SeRPEnT device through the local client system (e.g., to implement server output of input device state, such as a keyboard's caps lock LED). Similarly to the above, the SeRPEnT device implementing the trusted path flowing in the direction toward the peripheral device can operate in the trusted path mode and pass-through mode using the same physical ports and connections described above, except that in the trusted path mode the output is decrypted, rather than encrypted, by the SeRPEnT device before being provided to the input device.

Figure 10:
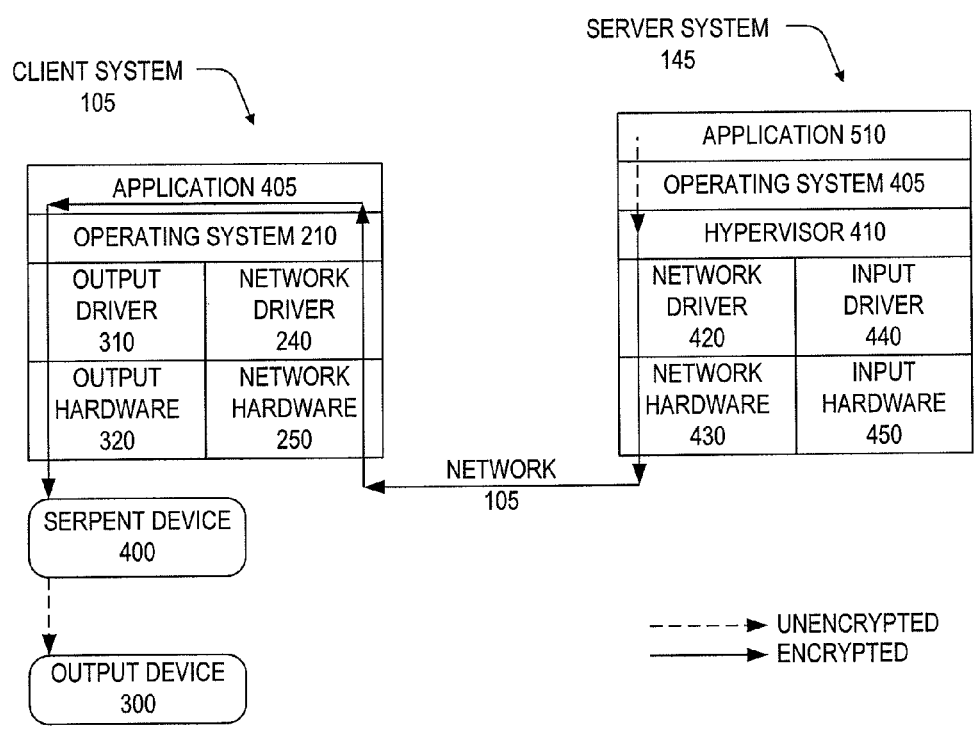
FIG. 10 illustrates an example of a trusted path from a SeRPEnT server to a SeRPEnT device for a peripheral output device in accordance with one embodiment.

The embodiment of FIGS. 4, 7 and 8 described above does not, though, provide a trusted path for output to an output device, such as a display path, that flows from the remote server system to the SeRPEnT device through the client system. While such a trusted path can be provided by the SeRPEnT device as shown in FIG. 10 (which can operate similarly to the trusted path disclosed in FIG. 9 and also be bidirectional), for some use cases such a trusted path may decrease usability/mobility. However, the trusted path embodiment of FIGS. 4, 7 and 8 for input devices, even in the absence of a trusted path for output devices such as a display path, can be viewed as a 100% solution for most use cases requiring trusted remote computing.

For instance, assume that the user system in FIG. 8 is completely compromised with the attacker having full privileges, and the user then goes to view a sensitive document which is accessible on a network share isolated in a way that only allows communication with a SeRPEnT server. First, the attacker will not be able to use a keystroke sniffer to capture the credentials being sent to the remote system. More importantly, the attacker will not be able to act on behalf of the user on the remote system. This is because the endpoint (i.e., client system 105) is just a proxy forwarding along the encrypted traffic with no means to decrypt it. Thus, the attacker cannot open other documents, initiate transfer of the documents to a less secure domain, etc.

At best, the attacker can screenscrape the user's framebuffer and see what the user is doing. (The attacker could also try to create a fictitious window that reacted to the user's interactions, but such an attack in a rich user-interface environment would be nontrivial, requiring significant video pattern recognition software and introducing obvious delays.) Being forced to perform virtual shoulder surfing in order to get data off of client system 105 puts the attacker at a significant disadvantage because this dramatically increases the amount of data which must be sent off the network in order to collect information, potentially setting this network traffic up to be detected.

And it is a far cry from the capability to completely impersonate a user that an attacker has today when they compromise a user's system. It is extremely common to see this type of attack play out in the real world. For example, an online banking fraud operation using a trojan called Silentbanker that circumvented the use of two-factor authentication systems was uncovered by officials in 2008. In essence, attackers, having established a pre-existing foothold on the user's system, had hijacked a user's session after proper authentication, effectively injecting commands into the communication stream between the web-browser and the server. A trusted path for keystrokes as provided by a system like SeRPEnT's can substantially mitigate this risk.

Alternatively, compare this to the situation where the user is a system administrator doing remote administration. Today, the administrator uses tools such as IP-KVM, VNC, or Microsoft RDP. In all of these systems, the compromise of the administrator's endpoint means compromise of every system the administrator interacts with thereafter. Power users such as system administrators can often be overconfident that their operational security (OpSec) behavior will sufficiently protect them, despite the fact that they too can fall victim to O-day exploits if targeted. It is not hard to imagine a trojan like Silentbanker being retrofitted to search for IP-KVM browser sessions. If, instead, the administrator's authentication and interaction with these remote systems were taking place over the trusted input path provided by SeRPEnT, the risk of an attacker gaining the full privileges of the administrator can be drastically reduced.

Further to the above, with support from graphics processors or monitor vendors a trusted video path can be created that cannot be easily logged, spoofed or modified by software on the compromised endpoint. A protected framebuffer and local cryptographic bindings can make this possible by, for example, securing video communications using a suitable digital copy protection mechanism such as High-bandwidth Digital Content Protection ("HDCP") or video card digital rights management ("DRM") capabilities to encrypt output from the server to a user's video device. The trusted video path can further comprise thin-client protocols such as the X Window system, remote framebuffer ("RFB"), and THINC which can provide efficient delivery of framebuffers to users.

With respect to computers such as laptops with integrated input and/or output devices (i.e., input and/or output devices that are not separable from the computer), SeRPEnT device 400 can also be used to provide a trusted input path and a trusted output path with such integrated devices.

Figure 11:
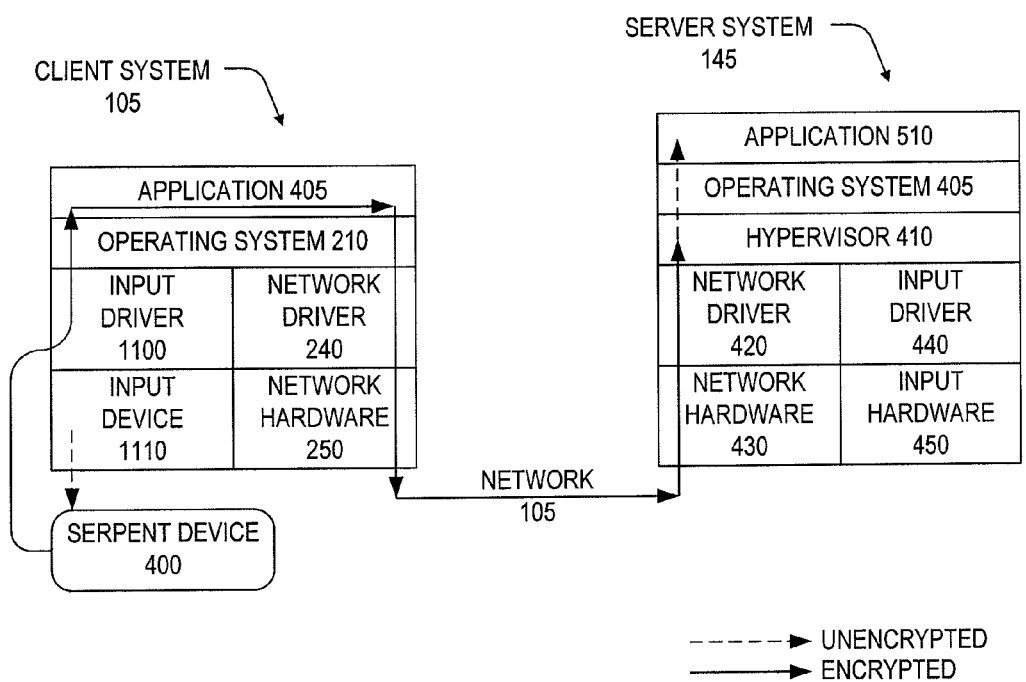
FIG. 11 illustrates an example of a trusted path for an integrated input device in accordance with one embodiment.

FIG. 11 illustrates an example of a trusted path for an integrated input device in accordance with one embodiment. In this embodiment, client system 105 comprises integrated input device 1110 and corresponding input driver 1100, and SeRPEnT device 400 comprises circuitry configured to receive input from integrated input device 1110 via one of its peripheral ports, encrypt the received input, and send the encrypted input to the computer via its computer port. The circuitry can be configured to receive the input via a loopback interface associated with integrated input device 1110.

Figure 12:
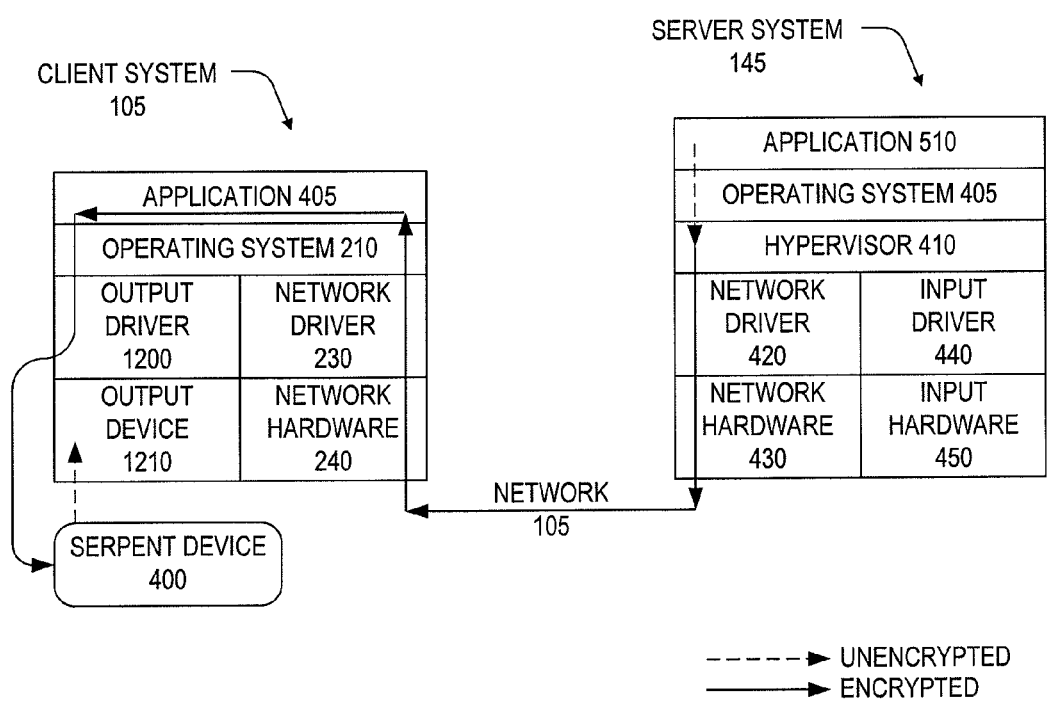
FIG. 12 illustrates an example of a trusted path for an integrated output device in accordance with one embodiment.

FIG. 12 illustrates an example of a trusted path for an integrated output device (e.g., a display path) in accordance with one embodiment. In this embodiment, client system 105 comprises integrated output device 1210 and corresponding output driver 1200, and SeRPEnT device 400 comprises circuitry configured to receive encrypted output from client system 105 (e.g., originating from server system 145) via one of its peripheral ports, decrypt the received output, and send the decrypted output to integrated output device 1210 via its computer port. The circuitry can be configured to receive the encrypted output via a loopback interface associated with integrated output device 1210.

The embodiments of FIGS. 11 and 12 can be used with computers with integrated input and/or output devices that provide a loopback interface for trusted I/O. The loopback provided by the computers can provide physical isolation of the I/O devices, rather than a software-based loopback where the user I/O is merely sent out another port. For example, a service provider such as a bank can send SeRPEnT device 400 to a user that fits into the loopback interface providing end-to-end encryption for the integrated keyboard/mouse/storage/video/audio subsystems that are needed to complete the transaction. SeRPEnT device 400 can be pre-programmed to specify the necessary computer subsystems to be used and cryptographic keying materials that can be used in encrypting/forwarding the device I/O to the server for re-injection into the backend virtual machine instance. Similarly to the embodiments described above, this system is robust against all software-based man-in-the middle attacks that plague commodity operating systems.

For the majority of I/O devices the driver can be loaded directly onto the security token (for USB classes that have a standard driver that can be sufficient for the use case) or in cases of performance intense I/O such as video, whereas other drivers could be loaded at the virtual machine end in cases where, for example, a proprietary USB device has been plugged into the computer and for which the service provider wishes not to expose the functioning of the driver to the user. To support video, a framebuffer update protocol can be used that sends only the portions of the frame that has changed.

Figure 13:
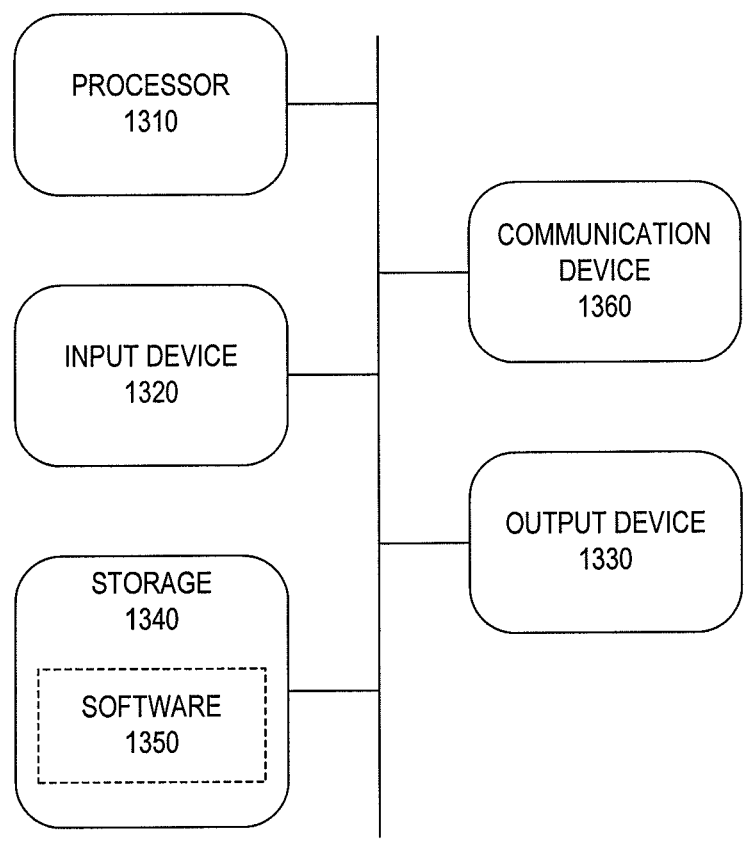
FIG. 13 illustrates an example of computer in accordance with one embodiment.

FIG. 13 illustrates an example of computer in accordance with one embodiment. As shown in FIG. 13, the computer can be any suitable type of microprocessor-based device, such as a personal computer, workstation, server or handheld computing device such as a phone or tablet. The computer can include, for example, one or more of processor 1310, input device 1320, output device 1330, storage 1340, and communication device 1360. Input device 1320 and output device 1330 can generally correspond to those described above, and can either be connectable or integrated with the computer.

Input device 1320 can be any suitable device that provides input, such as a touch screen or monitor, keyboard, mouse, or voice-recognition device. Output device 1330 can be any suitable device that provides output, such as a touch screen, monitor, printer, disk drive, or speaker.

Storage 1340 can be any suitable device the provides storage, such as an electrical, magnetic or optical memory including a RAM, cache, hard drive, CD-ROM drive, tape drive or removable storage disk. Communication device 1360 can include any suitable device capable of transmitting and receiving signals over a network, such as a network interface chip or card. The components of the computer can be connected in any suitable manner, such as via a physical bus or wirelessly.

Software 1350, which can be stored in storage 1340 and executed by processor 1310, can include, for example, the programming that embodies the functionality of the present disclosure (e.g., as embodied in the computers, servers and devices as described above). In some embodiments, software 1350 can include a combination of servers such as application servers and database servers.

Software 1350 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1340, that can contain or store programming for use by or in connection with an instruction execution system, apparatus, or device.

Software 1350 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Network 105 can be any suitable type of interconnected communication system. Network 105 can implement any suitable communications protocol and can be secured by any suitable security protocol. Network 105 can comprise network links of any suitable arrangement that can implement the transmission and reception of network signals, such as wireless network connections, T1 or T3 lines, cable networks, DSL, or telephone lines.

The computer can implement any operating system suitable for the type of device and requirements of the application as described above. Software 1350 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

It will be appreciated that the above description for clarity has described some embodiments of the disclosure with reference to single steps and computers. However, it will be apparent that any suitable distribution of functionality among each step or computer can be used without detracting from the disclosure. For example, functionality illustrated to be performed in a single step or by a single computer may be performed in multiple steps or by multiple computers. Hence, references to specific steps and computers may be seen as providing the described functionality rather than indicative of a strict logical or physical structure or organization.

The circuitry of the SeRPEnT device can be implemented in any suitable form, including hardware, software, firmware, or any combination of these. The circuitry can also be implemented partly as computer software running on one or more data processors and/or digital signal processors. The elements and components of the circuitry can be physically, functionally, and logically implemented in any suitable way. Indeed, the functionality can be implemented in a single unit, in a plurality of units, or as part of other functional units. As such, the circuitry can be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An apparatus comprising:
   a first port comprising a physical port connectable to an input device, the input device configured to generate one or more input events for a computer based on a user's operation of the input device;
   a second port comprising a physical port connectable to the computer; and
   circuitry configured to operate in a first mode and a second mode, wherein
      in the first mode, the circuitry passes one or more input events received from the input device via the first port through to the computer via the second port, and
      in the second mode, the circuitry encrypts one or more input events received from the input device via the first port and sends the encrypted input to the computer via the second port.

2. The apparatus of claim 1, wherein the first port comprises a Universal Serial Bus (USB) port.

3. The apparatus of claim 2, wherein the first port comprises an upstream USB port configured to provide a downstream connection to the input device.

4. The apparatus of claim 1, wherein the second port comprises a Universal Serial Bus (USB) port.

5. The apparatus of claim 4, wherein the second port comprises a downstream USB port configured to provide an upstream connection to the computer.

6. The apparatus of claim 1, wherein the circuitry is configured to make the apparatus appear to the computer as a single Universal Serial Bus (USB) composite device with an interface for the input device.

7. The apparatus of claim 1, comprising a switch configured to switch the circuitry between operating in the first mode and the second mode.

8. The apparatus of claim 7, wherein the switch comprises a button provided on the apparatus.

9. The apparatus of claim 1, wherein
   in the first mode, the circuitry passes output received from the computer via the second port through to the input device via the first port, and
   in the second mode, the circuitry decrypts output received from the computer via the second port and sends the decrypted output to the input device via the first port.

10. A method comprising:
    receiving, by an apparatus operating in a first mode, first one or more input events from an input device via a first port of the apparatus, the input device configured to generate one or more input events for a computer based on a user's operation of the input device;
    passing, by the apparatus operating in the first mode, the received first one or more input events through to the computer via a second port of the apparatus;
    receiving, by the apparatus operating in a second mode, second one or more input events from the input device via the first port of the apparatus;
    encrypting, by the apparatus operating in the second mode, the received second one or more input events; and
    passing, by the apparatus operating in the second mode, the encrypted second one or more input events through to the computer via the second port of the apparatus.

11. The method of claim 10, wherein the first port comprises a Universal Serial Bus (USB) port.

12. The method of claim 10, wherein the second port comprises a Universal Serial Bus (USB) port.

13. The method of claim 10, comprising appearing, by the apparatus, to the computer as a single Universal Serial Bus (USB) composite device with an interface for the input device.

14. The method of claim 10, comprising switching, by the apparatus, between operating in the first mode and the second mode in response to actuation of a switch.

15. The method of claim 14, wherein the switch comprises a button provided on the apparatus.

16. The method of claim 10, comprising
    receiving, by the apparatus operating in the first mode, a first output the computer via the second port of the apparatus;
    passing, by the apparatus operating in the first mode, the received first output through to the input device via the first port of the apparatus;
    receiving, by the apparatus operating in the second mode, a second output from the computer via the second port of the apparatus;
    decrypting, by the apparatus operating in the second mode, the received second output; and
    passing, by the apparatus operating in the second mode, the decrypted second output through to the input device via the first port of the apparatus.

17. The method of claim 10, wherein the input device comprises one of a keyboard and a mouse.

18. A system comprising:
    a computer;
    an input device configured to generate one or more input events for the computer based on a user's operation of the input device;
    an apparatus; and
    a server, wherein the apparatus comprises
- a first port comprising a physical port connectable to the input device,
- a second port comprising a physical port connectable to the computer, and
- circuitry configured to operate in a first mode and a second mode, wherein
  - in the first mode, the circuitry passes one or more input events received from the input device via the first port through to the computer via the second port, and
  - in the second mode, the circuitry encrypts one or more input events received from the input device via the first port and sends the encrypted one or more input events to the computer via the second port, wherein the computer is configured to forward the encrypted one or more input events from the apparatus to the server over a network, and wherein the server is configured to decrypt the encrypted one or more input events and provide the decrypted one or more input events to an application running on the server.

19. The system of claim 18, wherein upon connection to the computer, the apparatus is configured to provide the computer with software to enable the computer to implement a trusted path communication between the input device and the server.

20. The system of claim 18, wherein the server drops any input event from the computer that does not originate from the apparatus.

21. The system of claim 18, wherein the input device comprises one of a keyboard and a mouse.

22. An apparatus comprising:
- a physical port connectable to a computer comprising an integrated input device, the integrated input device configured to generate one or more input events for the computer based on a user's operation of the input device; and
- circuitry configured to
  - receive one or more input events from the integrated input device via the physical port,
  - encrypt the received one or more input events, and
  - send the encrypted one or more input events to the computer via the physical port.

23. The apparatus of claim 22, wherein the circuitry receives the one or more input events via a loopback interface associated with the integrated input device.

24. The apparatus of claim 22, wherein the computer comprises an integrated output device, and the circuitry is configured to
- receive encrypted output from the computer via the physical port,
- decrypt the received output, and
- send the decrypted output to the integrated output device via the physical port.

25. The apparatus of claim 22, wherein the circuitry receives the encrypted output via a loopback interface associated with the integrated output device.

* * * * *